United States Patent [19]

Cheredaryk et al.

[11] Patent Number: 4,858,425

[45] Date of Patent: Aug. 22, 1989

[54] REFLECTING ORNAMENT STRING

[76] Inventors: Lorne Cheredaryk; Wilfred Cheredaryk, both of 6065 Pitton Road, Niagara Falls, Ontario, Canada, L2H 1S2

[21] Appl. No.: 135,677

[22] Filed: Dec. 21, 1987

[51] Int. Cl.⁴ ................................................ F16G 13/00

[52] U.S. Cl. ........................................... 59/80; 59/95; 63/2; D11/6; D11/11; D11/141; 428/64; 156/64

[58] Field of Search ................... 63/1 R, 2 R; D11/1, D11/2, 3, 6, 8, 11, 121, 130, 141; 59/80, 95, 78, 79.1, 79.2, 78.1; 428/64, 911; 156/63, 70

[56] References Cited

U.S. PATENT DOCUMENTS

| | | | |
|---|---|---|---|
| D. 128,494 | 7/1941 | Lerner et al. | D11/11 |
| D. 152,864 | 3/1940 | Carlson | D11/8 |
| D. 164,629 | 9/1951 | Fels | D11/11 |
| 427,592 | 5/1890 | Mattewson | D11/6 |
| 966,626 | 8/1910 | Ummach | 59/78.1 |
| 1,504,016 | 8/1924 | Baehr | 428/64 |
| 1,718,368 | 6/1929 | Laupot | 59/78.1 |
| 1,797,968 | 3/1931 | Sweeney | 59/80 |
| 1,981,696 | 11/1934 | Harper | 59/80 |
| 2,076,956 | 4/1937 | Lowenstein | 59/80 |
| 2,608,050 | 8/1952 | Bender | 59/79.2 |
| 2,667,739 | 2/1954 | Flaig | 59/79.2 |
| 2,753,682 | 7/1956 | Gerstenblith | 59/79.2 |
| 2,852,923 | 9/1958 | Gamelsky | 59/80 |
| 3,186,120 | 6/1965 | Layson | 43/42.33 |
| 3,589,957 | 6/1971 | Cohn | 156/176 |
| 3,948,040 | 4/1976 | Tuppini | 59/78.1 |
| 4,122,666 | 10/1978 | Jessop | 59/80 |
| 4,736,608 | 4/1988 | Laws et al. | 72/200 |

*Primary Examiner*—David Jones

*Attorney, Agent, or Firm*—Kramer, Brufsky & Cifelli

[57] ABSTRACT

A suspended decoration ornament, comprising a chain of several decorative members. The decorative members are reflecting members and are connected with a thin cord so as to permit free rotation of each member relative to the others.

8 Claims, 2 Drawing Sheets

REFLECTING ORNAMENT STRING

BACKGROUND OF THE INVENTION

This invention relates to a suspended decoration ornament comprising a chain of reflecting members which freely spin relative to one another and may be used to decorate the home environment, including balconies, Christmas trees, aquariums, and flower buckets.

Previous attempts at suspended ornaments have suffered from the defect of relative rigidity. In U.S. Pat. No. 1,981,696, the connecting members between the reflecting members are rigid and therefore resist free angular movement of the reflecting members with respect to each other. Likewise, in U.S. Pat. No. 4,122,666, the interlocking mechanism between the links prevent their free relative rotation.

SUMMARY OF THE INVENTION

According to the present invention, there is provided an ornament comprising flexible cords and a plurality of reflecting members connected to each other by said flexible cords to form a approximate linear chain, which connection permits said reflecting members to freely assume various and changing relative angular positions to each other when the ornament is suspended from one end.

According to the present invention, there is provided additionally a method of ornamentation, comprising the steps of:

(a) suspending a flexible line;
(b) connecting a reflecting member to the line so that it may freely assume various and changing relative angular positions;
(c) suspending a flexible line from the reflecting member; and
(d) repeating steps (b) and (c) until desired.

BRIEF DESCRIPTION OF THE DRAWINGS

A preferred embodiment will now be described with reference to the drawings, in which.

DETAILED DESCRIPTION OF THE PREFERRED EMBODIMENTS

Figure 1:
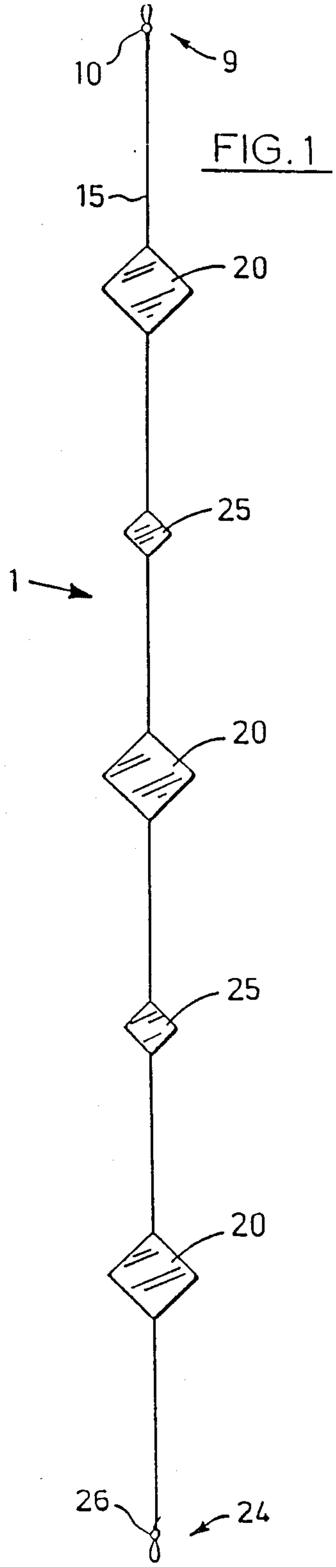
FIG. 1 is an elevational view of a preferred embodiment of an ornament according to the present invention.

In FIG. 1, there is shown the ornament, generally designated as 1, composed of reflecting members, exemplified by members 20 and 25 and described in detail below, joined by flexible cords 15.

At one end 9 of ornament 1, cord 15 is tied to swivel 10. As an alternative to swivel 10 (not shown) end 9 may be the free end of one flexible cord 15 looped and secured by an appropriate conventional metallic or plastic securing member, such as by swaging. Swivel 10 may be employed to suspend ornament 1 from a hook (not shown), so as to provide a free swivel action. At the other end 24 of ornament 1, cord 15 is tied to a second swivel 26, which may be identical to swivel 10. If ornament 1 is to be suspended vertically, swivel 26 may be used to secure end 24 to the ground (not shown). If ornament 1 is to be suspended in a non-vertical configuration, swivel 25 may be used to secure end 24 to maintain the desired configuration.

Figure 2:
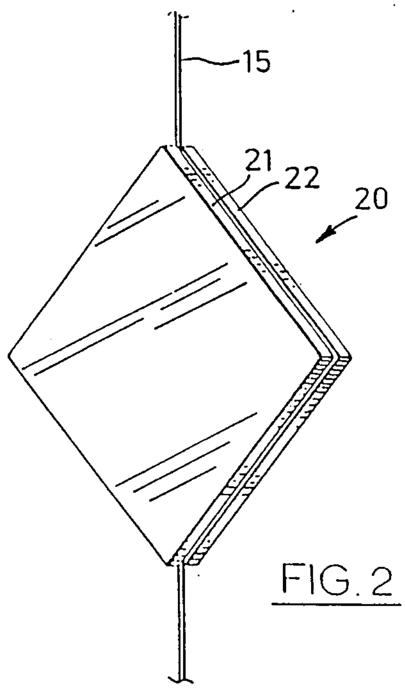
FIG. 2 is a front perspective view of one of the reflecting members of the ornament of FIG. 1.
Figure 3:
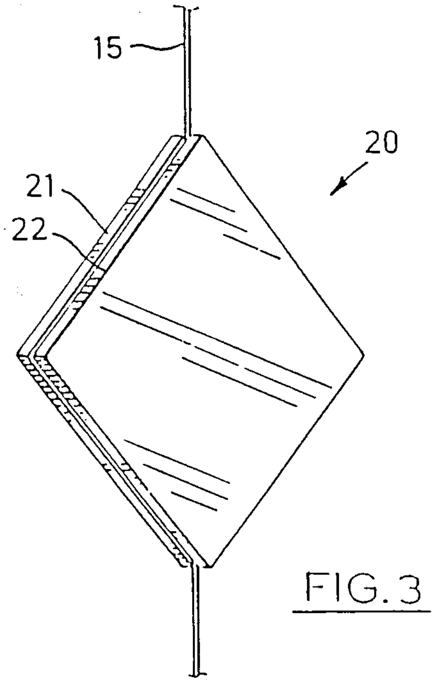
FIG. 3 is a rear perspective view of the reflecting member of FIG. 2.

In FIGS. 2 and 3, there is shown two perspective views of reflecting member 20. Reflecting member 20 is composed of two square mirrors 21 and 22 which may securely sandwich a single cord 15 between their non-mirror backs along the diagonal of the square mirrors 21 and 22, to two cords 15, each extending from opposing corners of square mirrors 21 and 22. Mirrors 21 and 22 are cut from plexiglass plates and are bonded by conventional weather-resistant adhesives, such as silicon adhesive Rhodorsil 3B (trade mark) by May & Baker. Cord 15 may be light, plastic monofilament line, such as fishing line. Reflecting member 25 is similar to reflecting member 20, except that its size is smaller.

It has been found that reflecting members 25 of one inch square mirror sandwiches, reflecting members 20 of two inch square mirror sandwiches, and a cord 15 length of approximately eight inches between reflecting members 20 and 25, provide for an attractive ornament to be employed on a patio, wherein the presence of light and a breeze, reflecting members freely rotate and produce a dazzling effect.

Figure 4:
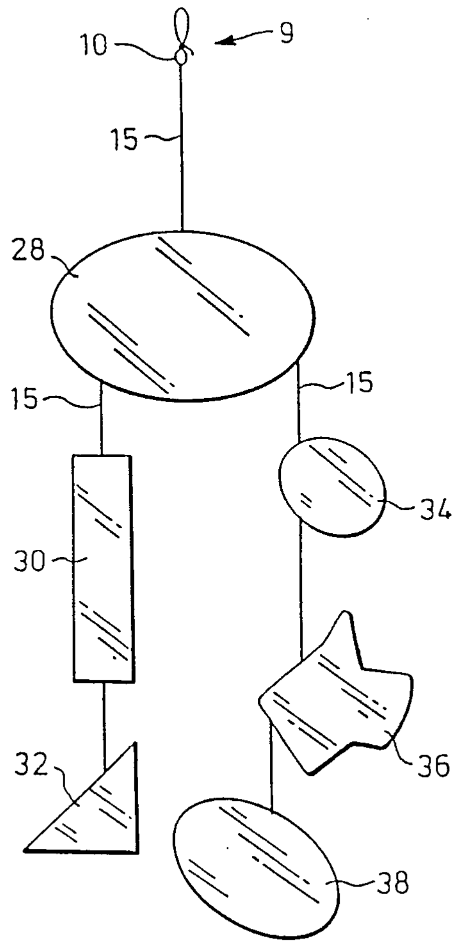
FIG. 4 is an elevational view of an alternative preferred embodiment of the invention.

A variation of the above described preferred embodiment is illustrated in FIG. 4. Reflecting members 28 to 32 may take on various shapes and cross-sections —polygonal, circular, ellipsoid and irregular —and may be joined by flexible cords 15 to form symmetrical or asymetrical sub-chains.

Refelecting members 20 and 28 to 32 may be composed of highly refractive materials and be coloured in any desirable way.

It will be apparent to those skilled in the art that the above-described embodiment is merely illustrative of the principles of the present invention. Numerous other embodiments may be devised without departing from the scope of the invention, as defined in the following claims.

What I claim as my invention is:

1. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, and wherein said reflecting members are paired elements bonded together back to back, and therebetween is securely disposed said flexible cord.

2. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, and wherein said reflecting members are paired elements bonded together back to back, and therebetween is securely disposed said flexible cord, and said reflecting members are of varying shapes, sizes and colors, and further comprising a rotatable swivel attached to the one end of the ornament.

3. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, and wherein said reflecting members are paired elements bonded back to back, and therebetween is securely disposed said flexible cord, further comprising a rotatable swivel attached to the one end of the ornament.

4. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, wherein said flexible cord is made of light fishing line, and wherein said reflecting members are paired elements bonded together back to back, and therebetween is securely disposed said flexible cord.

5. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, wherein said flexible cord is made of light fishing line, and wherein said reflecting members are paired elements bonded together back to back, and therebetewen is securely disposed said flexible cord, and said reflecting members are of varying shapes, sizes and colors.

6. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, wherein said flexible cord is made of light fishing line, and wherein said reflecting members are paired elements bonded together back to back, and therebetween is securely disposed said flexible cord, and said reflecting members are of varying shapes, sizes and colors, and further comprising a rotatable swivel attached to the one end of the ornament.

7. An ornament comprising a flexible cord and a plurality of reflecting members connected each to the other by said flexible cord to form an approximate linear chain, which connection permits said reflecting members to freely assume various and changing relative angular positions to each other when the ornament is suspended from one end, wherein said flexible cord is made of light fishing line, and wherein said reflecting members are paired elements bonded back to back, and therebetween is securely disposed said flexible cord, further comprising a rotatable swivel attached to the one end of the ornament.

8. An ornament comprising a flexible cord and a plurality of reflecting members connected each to the other by said flexible cord to from an approximate linear chain, which connection permits said reflecting members to freely assume various and changing relative angular positions to each other when the ornament is suspended from one end, wherein said flexible cord is made of light fishing line, and wherein said reflecting members are also refractive.

* * * * *